UNITED STATES PATENT OFFICE.

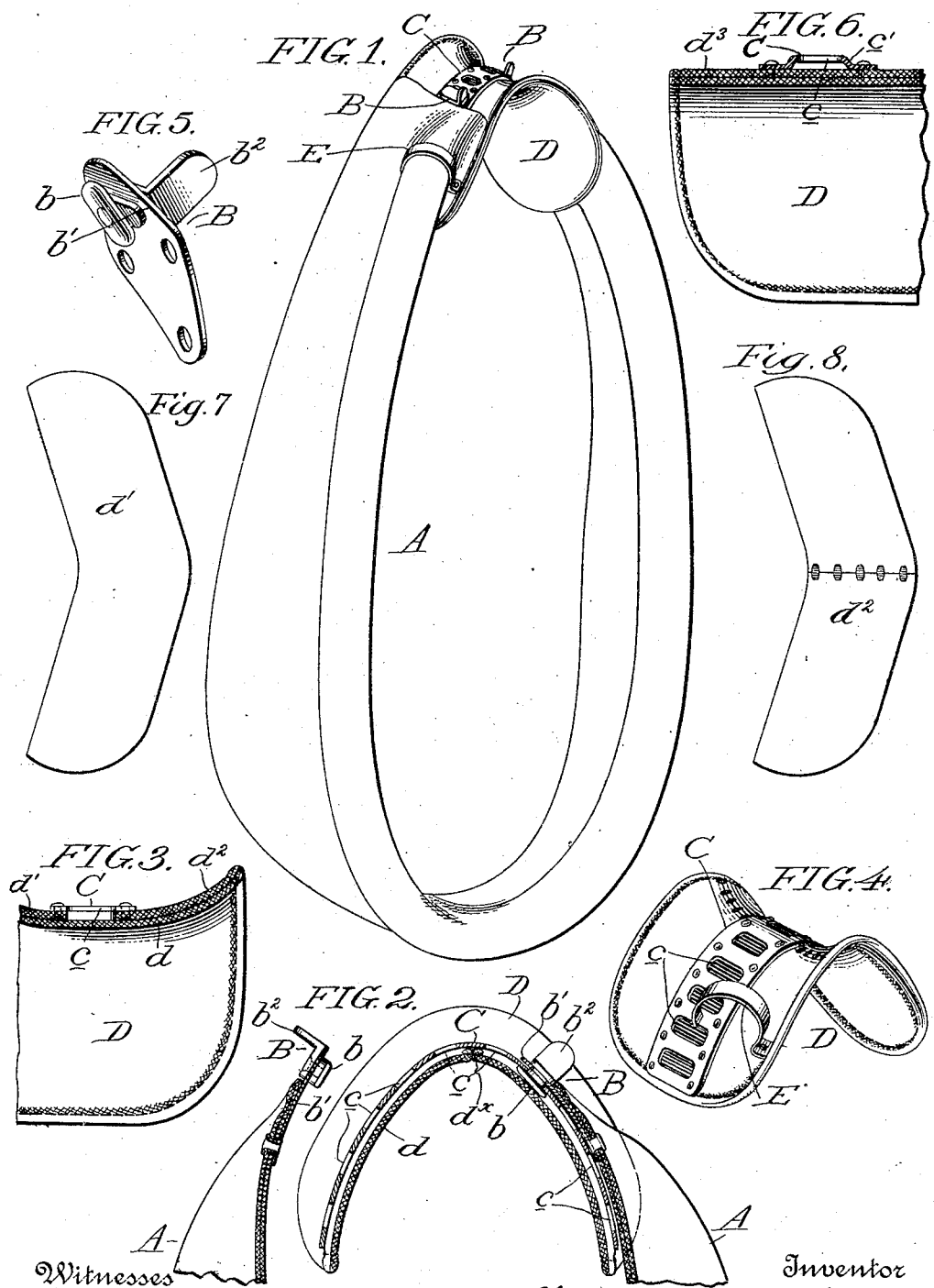

CHARLES WILLIAM CAMPBELL, OF MACON, GEORGIA.

HORSE-COLLAR.

No. 857,594.  Specification of Letters Patent.  Patented June 25, 1907.

Application filed May 2, 1906. Serial No. 314,835.

*To all whom it may concern:*

Be it known that I, CHARLES WILLIAM CAMPBELL, a citizen of the United States, residing at Macon, in the county of Bibb and State of Georgia, have invented certain new and useful Improvements in Horse-Collars; and I do hereby declare the following to be a full, clear, and exact description of the invention, such as will enable others skilled in the art to which it appertains to make and use the same.

This invention is more particularly an improved device or contrivance for facilitating the fastening and unfastening of a horse collar around the neck of a horse, and affording convenient means for easily varying the size of the collar to adjust the same to the horse's neck or to fit different horses, such adjustment being accomplished without impairing the symmetry of the collar or changing the position of the top collar-pad or upper portion of the collar which bears upon the horse's neck.

One preferred form or embodiment of the invention is illustrated in the accompanying drawings, which form a part of this specification, it being understood however that the invention is susceptible of embodiment in other forms and modification in respect to details. Without limitation therefore to the specific embodiment illustrated, the invention will hereinafter be first fully described with reference to said drawings and more particularly pointed out and defined in the appended claims.

In said drawings, Figure 1 is a perspective view of a horse collar embodying my invention. Fig. 2 is an enlarged central vertical section through the upper portion of the collar, showing the same unfastened or separated; this section being taken longitudinally through the collar, that is in a direction transverse of a horse's neck. Fig. 3 is a fragmentary central vertical section through the collar-pad, this section being taken crosswise to that shown in Fig. 2. Fig. 4 is a perspective view of the said collar-pad. Fig. 5 is an enlarged perspective view of one of the fastening devices carried by the free ends or points of the collar, for engaging in the lock-strap of the collar-pad. Fig. 6 is a fragmentary section, similar to Fig. 3, showing a different form of collar-pad and metal lock-strap. Fig. 7 is a plan view of one of the half-portions of the upper part of the collar-pad, showing the same made as an integral piece. Fig. 8 is a similar view of the opposite half-portion shown made of two pieces united together.

The collar A is separable or divided, either at its upper or lower end, and the points or free ends of the collar carry locking or fastening devices B adapted for adjustable engagement or connection with a metal lock-strap C on a detachable collar-pad D. In the present illustration, the horse collar is shown separable or divided at the top, the invention being applied to the upper end thereof, but the contrivance is equally applicable to the lower end of a collar which is separable or divided at the bottom. In the case of a collar separable at the top, the collar-pad D is of course shaped to straddle the neck of the horse and provide an easy bearing, performing the regular functions of a collar-pad; while in the case of a collar separable at the bottom, the pad would be shaped to conform to the throat or breast of the animal. Said collar-pad D may be either rolled, as shown in Figs. 1, 3 and 4, or it may be substantially or approximately flat in cross-section, as shown in Fig. 6. The rolled form or shape is preferable, for affording a more comfortable bearing upon the neck of the animal, the pad being rolled or turned upward both forwardly and backwardly, as shown clearly in Figs. 1 and 4, where the pad is approximately saddle-shape in miniature.

The lock-strap C is an elongated strip or strap of thin metal, desirably sheet-metal, arranged preferably at approximately the middle of the collar-pad, on its upper surface, and secured thereto in any suitable manner, as by means of rivets, staples, or prongs cut from the metal of the strap itself and clenched in or to the material of the pad, or by other suitable and convenient means. Said metal lock-strap may extend practically from end to end of the pad, as shown, or may be of a lesser relative length if desired, though it is preferable that the strap be of a length substantially co-extensive with the pad, not only for increasing the range of adjustment, but also to more effectively brace and strengthen the pad. The lock-strap, which is raised above the subjacent portion of the pad, is provided with a series of holes or apertures c, there being preferably an equal number of such holes at each inclined side of the pad, and the corresponding holes at each side being preferably spaced at substantially equal distances from the center of the pad; it being understood of course that this precision is not essential, but is desirable for increasing the perfection of the device and obtaining greater accuracy in adjustment and setting of the collar. These holes $c$, which are shown as oblong holes extending crosswise of the metal lock-strap, are designed for engagement by the fastening or locking devices B, carried by the points or free ends of the collar, as before mentioned.

In the case of a rolled collar-pad, as shown in Figs. 1, 2, 3 and 4, the construction is preferably as follows: The upper surface of the pad consists of two pieces or half-portions $d'$ and $d^2$ of leather or other suitable material, secured upon the bottom piece or under pad portion $d$, which latter may also be of leather, or of felt, cloth or any desired and appropriate material. The adjacent or inner edges of said pieces or half-portions $d'$ and $d^2$ are separated, leaving a space along the middle of the pad under the oblong holes or perforations in the metal lock-strap, said lock-strap being flat and having its edges secured to the said inner or adjacent edges of the pieces $d'$ and $d^2$. By this means, recesses are provided under the perforated lock-strap, to allow the fastening devices B to engage therein, under the lock-strap. The said upper half-parts or pieces $d'$ and $d^2$, when cut for constructing the pad, are curved or approximately crescent-shaped, as shown in Figs. 7 and 8. Hence, when the several parts of the pad are assembled and connected together, the inner or confronting concave edges of these parts $d'$ and $d^2$ being secured to the opposite edges of the lock-strap will cause the pad to roll upwardly at opposite sides of the lock-strap, as shown in the drawings, and will effectually retain this form, preventing sagging or mashing down flat in use. This rolled shape of the pad is further promoted by constructing the under portion $d$ of the pad in two half-parts having curved or concave edges joined by a medial seam, as indicated at $d^\times$ in Fig. 2, said seam running crosswise of the lock-strap. Referring again to the top pieces $d'$ and $d^2$, these may consist of integral pieces of leather or material, as shown in Fig. 7; or each may consist of two pieces stapled or otherwise joined together as in Fig. 8; the latter form being preferred for economy of construction, since it enables the parts to be made from scraps.

In the case of a flat pad, as shown in Fig. 6, the upper surface $d^3$ of the pad may be continuous, and the lock-strap C may be rolled or upset, as indicated at $c'$, to raise the perforated portion of the lock-strap sufficiently above the surface of the pad.

The fastening or latching devices B consist of metal pieces or catches $b$ adapted to enter the holes $c$ in the metal lock-strap C and then to be turned therein for engaging the under surface of the metal lock-strap. They are pivotally attached to thin plates or clips $b'$, which are riveted or otherwise secured to the ends or points of the collar, and the pivots or axes of said locking pieces are provided with small angle-shaped levers $b^2$, adapted for engagement by the thumb or finger of a person for manipulating the locking pieces. These angle-shaped levers $b^2$ are so disposed that they extend forwardly when the latches are in locking position in the lock-strap, as shown in Fig. 1, and thereby provide abutments for holding the hames from working forward and jumping out of the hameholt. In this position, the latches are securely held by the hames, so that there is no possibility of unlatching. The latches are of suitable form to pass through the holes in one position of the finger-pieces, and to catch under the strap in the locking position of said finger-pieces, being shown as oblong to pass through the oblong holes and then to be turned crosswise for engaging under the lock-strap. Any suitable form of holes and latches may of course be adopted; such as appropriate eccentrically-pivoted latches and corresponding holes.

Referring to the operation of the device, it will be observed that the collar-pad D with the metal lock-strap C is arranged at the separable or divided end of the collar (at the top in the present illustration), the points or free ends of the collar being arranged to overlie the opposite inclined sides of the pad, and the latches $b$ engaged in the metal lock-strap, in the manner already stated. The latch at each side of the pad should of course be engaged in a recess corresponding to that engaged by the latch at the other side of the pad, in order to preserve the symmetrical form of the collar and have the pad bear directly upon the top of the horse's neck, and fit comfortably. To detach the collar from the horse, it is simply necessary to turn one of the latches so as to disengage from the metal lock-strap, whereupon the collar can be separated and easily withdrawn off the neck of the animal, as represented in Fig. 2. To adjust or vary the size of the collar, in order to fit the horse's neck, or to fit different animals, it is merely necessary to engage the latches in different recesses of the metal lock-strap. Both the fastening and the unfastening of the collar, and the adjustment thereof, are thus very conveniently performed, by this simple contrivance. As before noted, when the latches are in locking position, the finger pieces extend forwardly and upwardly, providing an abutment for the hames, and the latches are thus securely held in locking position, without possibility of unlatching. Moreover, the engagement between the latches and the lock-strap holds the collar-pad firmly in position, preventing the pad working out of place and chafing the animal.

For preventing the collar-pad from falling from the collar when not in use, the pad is preferably provided with a spring E, as shown in Figs. 1 and 4, this spring being arranged to engage the rim of the collar, and serve as a clip for holding the pad in place. Hence should the latches become detached, when handling the collar off the horse, the spring will hold the pad and prevent its dropping off.

The device described is applicable for attachment to all ordinary collars, making the use general, and it will be observed that the latches can be manipulated simply by pressure of the fingers, without the use of any tools, which is both simple and convenient.

In this application, I make no specific claim to the collar pad *per se*, since the same is shown, described and claimed in my copending application, Serial No. 345,628, filed Nov. 30, 1906.

Having thus fully described my invention, what I claim as new and desire to secure by Letters Patent of the United States is:—

1. The combination of a separable or divided collar carrying pivoted latches at its free ends, and a collar pad arranged at the divided portion of the collar and overlapped by the ends thereof, and a longitudinally-arranged metal lock-strap on said pad provided with holes therein for engagement by said latches, the latter comprising pintles having outside finger-pieces and inside foot-pieces so disposed on said pintles as to enter said holes in one position and to engage and lock under the lock-strap when turned to another position.

2. In a horse collar, the combination of a divided or separable collar, a pad arranged between the ends of the collar, a metal lock-strap on said pad having a series of holes therein, the surface of the strap being above the subjacent portion of the pad, and pivoted latches carried by the ends of the collar adapted to enter said holes and when turned to engage the under side of the lock-strap.

3. In a horse collar, the combination of a separable or divided collar, a collar-pad arranged between the ends thereof, a metal lock-strap arranged and secured longitudinally of the pad, said lock-strap having a series of oblong holes therein, the perforated portion of the lock-strap being above the subjacent portion of the pad, pivoted latches carried by the ends of the collar adapted to enter said holes and to be turned for engaging the under side of the lock-strap, and finger pieces attached to said latches for manipulating the same, said finger pieces adapted to be engaged by the hames for holding the latches in locking position.

4. The combination with the pad having a perforated lock-strap, of the divided or separable collar having its free ends adapted to overlie the pad and provided with latches to engage said lock-strap, said latches comprising pintles provided with inside foot-pieces disposed so as to enter said holes in one position and when turned to engage under the lock-strap, and provided with the outside angle-shaped finger pieces $b^2$ adapted to extend toward the front of the collar when the latches are in locking position, whereby said finger pieces are adapted to be engaged by the harness strap to hold the harness from slipping forward and to hold the latches locked, substantially as described.

5. In combination with an adjustable collar of the character described carrying latches at its points, a rolled collar-pad comprising an under pad portion and two upper pieces secured thereon and separated at opposite sides of the medial line, leaving a longitudinal space between said upper pieces, and a metal lock-strap secured on the pad over said space and provided with holes for engagement by latches.

In testimony whereof I affix my signature, in presence of two witnesses.

CHARLES WILLIAM CAMPBELL.

Witnesses:
L. D. MOORE,
R. V. HARDEMAN.